(12) United States Patent
Short et al.

(10) Patent No.: US 6,918,613 B2
(45) Date of Patent: Jul. 19, 2005

(54) AIR BAG INFLATOR GAS VENTING SYSTEM

(75) Inventors: Chris John Short, Dexter, MI (US); Fred Leslie Sole, Plymouth, MI (US); Marshall Lawrence Quade, Pinckney, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/709,245

(22) Filed: Apr. 23, 2004

(65) Prior Publication Data

US 2004/0188990 A1 Sep. 30, 2004

Related U.S. Application Data

(62) Division of application No. 10/117,153, filed on Apr. 5, 2002, now Pat. No. 6,746,045.

(51) Int. Cl.[7] .............................................. B60R 21/26
(52) U.S. Cl. ..................................... 280/736; 280/743.2
(58) Field of Search ................................ 280/736, 739, 280/742, 743.2, 738

(56) References Cited

U.S. PATENT DOCUMENTS

| | | |
|---|---|---|
| 3,884,499 A | 5/1975 | Oak et al. |
| 3,944,250 A | 3/1976 | Wulf et al. |
| 4,071,187 A | 1/1978 | LaFleur |
| 4,097,065 A | 6/1978 | Okada et al. |
| 4,111,458 A | 9/1978 | Okada et al. |
| 4,532,652 A | 7/1985 | Herrington |
| 4,805,930 A | 2/1989 | Takada |
| 4,877,264 A | 10/1989 | Cuevas |
| 4,903,986 A | 2/1990 | Cok et al. |
| 5,004,123 A | 4/1991 | Stoody |
| 5,007,662 A | 4/1991 | Abramczyk et al. |
| 5,013,064 A | 5/1991 | Miller et al. |
| 5,044,663 A | 9/1991 | Seizert |
| RE33,938 E | 5/1992 | Cuevas |
| 5,161,776 A | 11/1992 | Nicholson |
| 5,219,179 A | 6/1993 | Eyrainer et al. |
| 5,234,229 A | 8/1993 | Gordon |
| 5,280,953 A | 1/1994 | Wolanin et al. |
| 5,310,215 A | 5/1994 | Wallner |
| 5,332,257 A | 7/1994 | Rogers et al. |
| 5,332,259 A | 7/1994 | Conlee et al. |
| 5,340,151 A | 8/1994 | Sato |
| 5,366,242 A | 11/1994 | Faigle et al. |
| 5,398,960 A | 3/1995 | Ravenberg et al. |
| 5,439,032 A | 8/1995 | Petrone |
| 5,478,111 A | 12/1995 | Marchant et al. |
| 5,492,364 A | 2/1996 | Anderson et al. |
| 5,531,476 A | 7/1996 | Kerner |
| 5,603,526 A | 2/1997 | Buchanan |
| 5,634,659 A | 6/1997 | Abraham |
| 5,647,607 A | 7/1997 | Bolieau |
| 5,664,802 A | 9/1997 | Harris et al. |
| 5,664,807 A | 9/1997 | Bohmler |
| 5,669,628 A | 9/1997 | Kaufmann et al. |

(Continued)

FOREIGN PATENT DOCUMENTS

| | | | | |
|---|---|---|---|---|
| FR | 2757465 A1 | * | 6/1998 | .......... B60R/21/28 |
| JP | 05330395 A | * | 12/1993 | .......... B60R/21/28 |

*Primary Examiner*—Peter C. English
(74) *Attorney, Agent, or Firm*—Gary Smith

(57) ABSTRACT

An air bag module for venting inflation gas if an out-of-position vehicle occupant is too close to the module for proper air bag deployment. The module has an air bag canister having a gas channel port, an inflator, an air bag cushion, a deployment door, a structural gas channel, and a venting system. The venting system connects the structural gas channel to the gas channel port and includes a plug and a plug pulling system for controlling the venting of gas.

9 Claims, 4 Drawing Sheets

U.S. PATENT DOCUMENTS

| | | |
|---|---|---|
| 5,681,052 A | 10/1997 | Ricks et al. |
| 5,695,214 A | 12/1997 | Faigle et al. |
| 5,704,639 A | 1/1998 | Cundill et al. |
| 5,743,558 A | 4/1998 | Seymour |
| 5,762,364 A | 6/1998 | Cuevas |
| 5,779,265 A | 7/1998 | Rose et al. |
| 5,813,693 A | 9/1998 | Gordon et al. |
| 5,839,755 A | 11/1998 | Turnbull |
| 5,848,805 A | 12/1998 | Sogi et al. |
| 5,853,192 A | 12/1998 | Sikorski et al. |
| 5,871,231 A | 2/1999 | Richards et al. |
| 5,882,036 A | 3/1999 | Moore et al. |
| 5,887,894 A | 3/1999 | Castagner et al. |
| 5,918,901 A | 7/1999 | Johnson et al. |
| 5,941,557 A | 8/1999 | Mullins, Jr. et al. |
| 5,947,512 A | 9/1999 | Magoteaux et al. |
| 5,967,551 A | 10/1999 | Newkirk et al. |
| 5,988,677 A | 11/1999 | Adomeit et al. |
| 5,997,037 A | 12/1999 | Hill et al. |
| 6,022,046 A | 2/2000 | Isomura et al. |
| 6,053,527 A | 4/2000 | Gans et al. |
| 6,056,318 A | 5/2000 | Braunschadel |
| 6,076,854 A | 6/2000 | Schenck et al. |
| 6,082,765 A | 7/2000 | Bowers et al. |
| 6,086,096 A | 7/2000 | Link et al. |
| 6,131,943 A | 10/2000 | Breitweg |
| 6,142,517 A | 11/2000 | Nakamura et al. |
| 6,158,770 A | 12/2000 | Ryan et al. |
| 6,170,859 B1 | 1/2001 | Kausch |
| 6,179,322 B1 | 1/2001 | Faigle et al. |
| 6,183,003 B1 | 2/2001 | Matsuhashi et al. |
| 6,189,924 B1 | 2/2001 | Hock |
| 6,189,926 B1 | 2/2001 | Smith |
| 6,206,408 B1 | 3/2001 | Schneider |
| 6,206,417 B1 | 3/2001 | Soderquist et al. |
| 6,224,583 B1 | 5/2001 | Perkins et al. |
| 6,241,283 B1 | 6/2001 | Zarazua |
| 6,250,677 B1 | 6/2001 | Fujimura |
| 6,254,121 B1 | 7/2001 | Fowler et al. |
| 6,254,129 B1 | 7/2001 | Rink et al. |
| 6,254,130 B1 | 7/2001 | Jayaraman et al. |
| 6,273,463 B1 | 8/2001 | Peterson et al. |
| 6,290,257 B1 | 9/2001 | Bunce et al. |
| 6,371,517 B1 | 4/2002 | Webber et al. |
| 6,513,835 B2 | 2/2003 | Thomas |
| 2003/0155756 A1 * | 8/2003 | Hawthorn et al. .......... 280/739 |

* cited by examiner

AIR BAG INFLATOR GAS VENTING SYSTEM

CROSS REFERENCE TO RELATED APPLICATIONS

This application is a division of U.S. application Ser. No. 10/117,153 filed Apr. 5, 2002, U.S. Pat. No. 6,746,045.

BACKGROUND OF INVENTION

1. Field of the Invention

This invention relates generally to a passenger vehicle occupant restraint system having an air bag module and, more particularly, to an air bag module having direct venting.

2. Background Art

Occupant restraint systems employing air bag modules are well known. During a collision of a predetermined magnitude, an air bag cushion is inflated by an inflator and is deployed in the vehicle for protection of the vehicle occupant. The air bag cushion is deployed at a high rate of speed and force optimized to protect a wide range of occupants under various conditions. There are, however, times when deploying an air bag cushion is not desirable, such as when a vehicle occupant is so close to the air bag that normal deployment of the air bag may cause injury to the occupant. An occupant that is too close to the air bag is said to be out of position. Various air bag module designs have been developed to reduce the amount of pressure and force caused by an air bag deployment to an out of place vehicle occupant. For example, some systems use vents on the air bag cushion that open and release gases generated by the inflator as the bag is deploying. However, these systems only control the rate and amount of inflation of the air bag cushion in a predetermined manner, but do not do so in response to the position of the occupant.

Another system disclosed in U.S. Pat. No. 6,206,408 uses vents on the air bag canister side wall that are initially open and slidingly close if no force is exerted on the deployment door. If force is exerted onto the deployment door, the vents remain open and the gas is vented therethrough, thereby thwarting deployment of the air bag cushion. However, this device is exceedingly complicated to manufacture requiring sliding mechanisms.

It would be desirable to have an occupant restraint system employing an air bag cushion that does not fully deploy when an occupant is out of position that is of a simple design.

SUMMARY OF INVENTION

It is an object of this invention to provide an occupant restraint system having an air bag module that does not fully deploy an air bag cushion if the vehicle occupant is out of position and is of a simple design.

Accordingly, this invention features an air bag module having direct venting of the air bag inflator gas into the ambient air if external force is exerted on the deployment door. If no external force is exerted on the deployment door, then the air bag cushion deploys normally through the deployment door and into the passenger compartment. The air bag module comprises an air bag canister having at least one side wall, the a side wall having a gas channel port to communicate with the ambient air, an air bag cushion attached to the canister, an inflator attached to the air bag canister for providing gas, a deployment door attached to the canister, a structural gas channel configured to communicate with the gas channel port to provide venting of gas provided by the inflator to the ambient air if external force is applied to the deployment door, and a venting system connecting the structural gas channel to the gas channel port and operative to prevent venting of gas through the gas channel port from the canister when the air bag cushion is in a substantially deployed condition.

The venting system may include a plug located outside the canister and a pulling system to connect the plug to the air bag cushion. The plug may be connected directly to the air bag cushion by a plug tether or indirectly by connecting the plug tether to an air bag-shaping tether. During normal deployment of the air bag cushion, the tether connected to the plug is made taut, thereby pulling the plug into the gas channel port and preventing any gas from venting therethrough.

DETAILED DESCRIPTION

Figure 1:
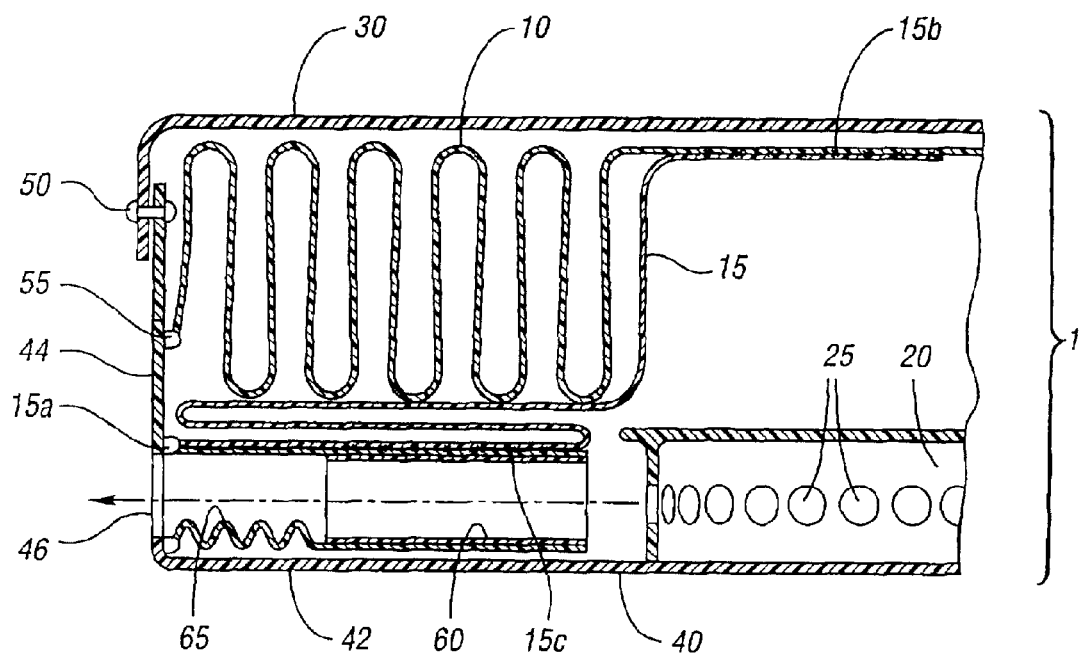
FIG. 1 is a cross-sectional view of a first embodiment of the air bag module of the present invention in the undeployed condition.
Figure 2:
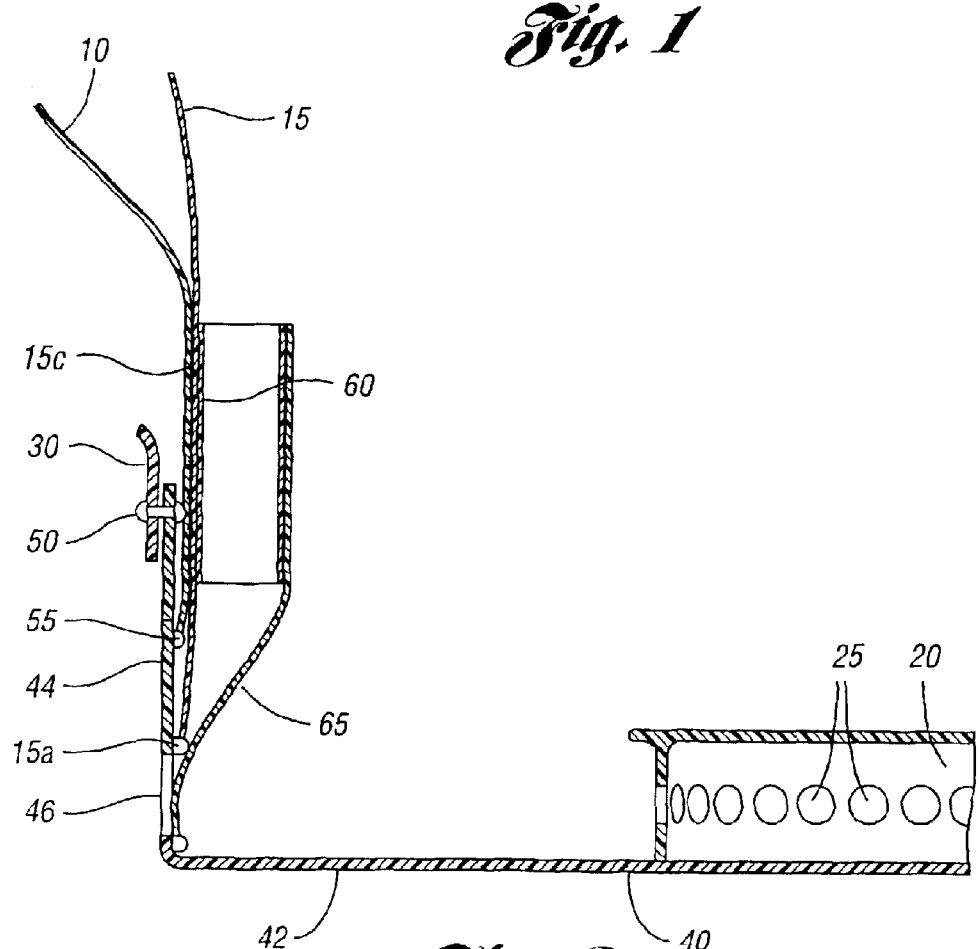
FIG. 2 is a cross-sectional view of the first embodiment of the air bag module of the present invention with the air bag deployed.

Referring now to FIGS. 1 and 2, a first embodiment of an air bag module 1 of the present invention is shown. This embodiment and the embodiments subsequently discussed are described in U.S. Pat. No. 6,746,045, which is incorporated by reference in its entirety.

In FIGS. 1 and 2, an air bag cushion 10 is shown in non-deployed and deployed positions, respectively. The air bag module 1 comprises an inflator 20 attached to a canister 40 preferably having a backing plate 42 and side walls 44. At least one side wall 44 has at least one gas channel port 46 thereon to vent gas to the ambient air if necessary. The canister can be made circular thereby having only a single side wall 44 or polygonal having multiple side walls. Additionally, there may be more than one gas channel port 46.

A structural gas channel 60, made out of at least a semi-rigid material, communicates with the gas channel port 46 to vent into the ambient air. The structural gas channel 60 must be rigid enough not to deform from the heat and pressure generated by the inflator 20 or from the packaging pressure of the air bag cushion 10. The structural gas channel 60 is pivotally connected to the canister side walls 44 by a non-porous fabric gas channel 65, which is flexible but does not let a substantial amount of gas permeate. The non-porous fabric gas channel 65 is pivotally attached to a canister side wall 44 by a known method. The structural gas channel 60 may pivotally connect to the side wall directly or may indirectly connect to the side wall 44 through the non-porous fabric gas channel 65.

An air bag cushion 10 is attached to the canister side walls 44 using known methods such as a rivet 55. At least one bag-shaping tether 15 is connected at a first location 15a to the side wall 44 and at a second location 15b to the air bag cushion 10. Bag-shaping tether 15 controls the deployed shape of the air bag cushion 10, as is well known in the restraints art. Tether 15 is also connected to the structural gas channel 60 at a third location 15c. A deployment door 30 is attached to the canister side wall 44 using known attachment means such as a rivet 50.

During normal deployment of the air bag cushion 10 as shown in FIG. 2, the inflator 20 begins inflating the air bag cushion using inflator nozzles 25 by known methods. The air bag cushion 10 expands and begins exerting a force on the deployment door 30. A majority of the gas generated by the inflator 20 goes into expanding the air bag cushion 10 while a smaller amount may be vented through the gas channel port 46. When enough gas accumulates in the air bag cushion 10, the air bag cushion deploys in a normal manner by bursting through the deployment door 30 and fully inflating within the vehicle to protect the occupant (not shown). As the cushion 10 expands out of the canister 40, it pulls bag-shaping tether 15 taut, thereby pulling the structural gas channel 46 and the non-porous fabric gas channel 65 so that they pivot upward to the position shown in FIG. 2. In this position, non-porous fabric gas channel 65 blocks off the gas channel port 46, thus allowing the air bag cushion 10 to fully inflate.

If, however, a force is exerted on the deployment door 30 by, for example, an out-of-position occupant (not shown), the gas generated by the inflator 20 is not able to expand the air bag cushion 10 to the point where deployment of the air bag cushion pulls bag-shaping tether 15, structural gas channel 60, and non-porous fabric gas channel 65 to the position shown in FIG. 2. Instead, the gas channels 60, 65 remain substantially in the position shown in FIG. 1 so that most of the inflation gas exits through the structural gas channel 60 and the non-porous fabric gas channel 65, thus preventing full deployment of the air bag cushion. This prevents the undesirable situation of the air bag cushion 10 deploying directly into an out-of-position occupant with sufficient force to cause injury.

If a particular air bag design does not include a bag-shaping tether, structural gas channel 60 may be attached to air bag cushion 10 by a tether provided specifically for that purpose.

Figure 3:
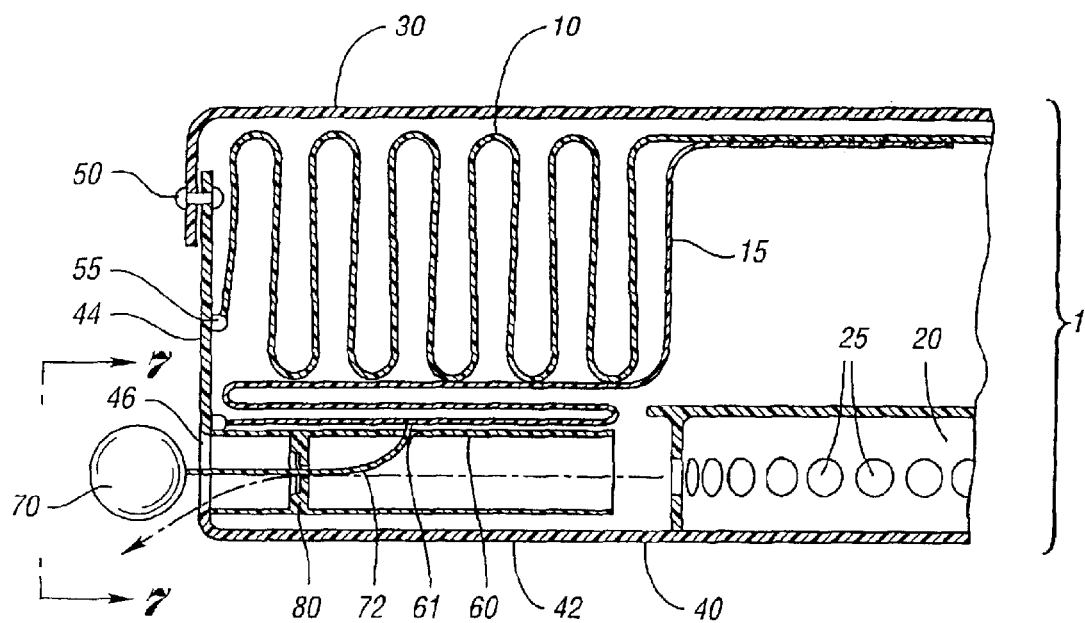
FIG. 3 is a cross-sectional view of a second embodiment of the air bag module of the present invention in the undeployed condition.
Figure 4:
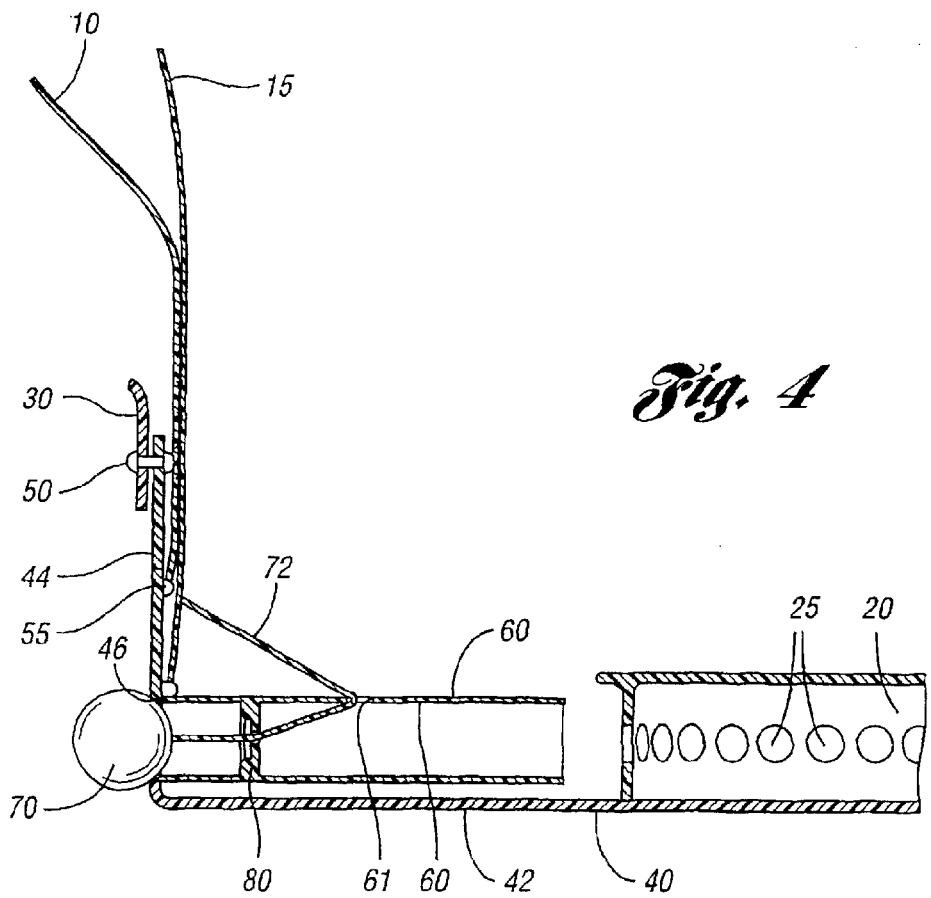
FIG. 4 is a cross-sectional view of the second embodiment of the air bag module of the present invention with the air bag deployed.
Figure 7:
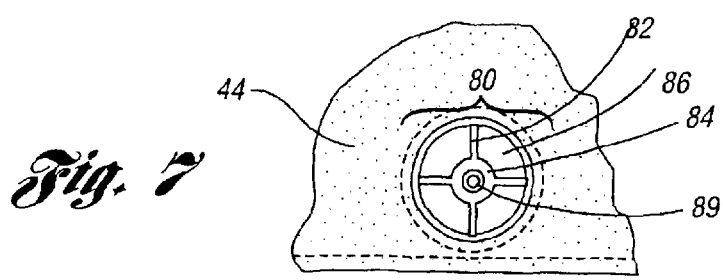
FIG. 7 is a view taken along line 7—7 in FIG. 3.

In a second embodiment of the invention illustrated in FIGS. 3, 4 and 7, a plug 70 is used to prevent venting of inflator gases to the ambient air during a normal air bag deployment. Plug 70 is shown to be spherical, but may be of any appropriate shape, such as conical, hemispherical, or tapered. The structural gas channel 60 is not pivotally attached but is instead connected to the canister 40. A plug centering guide 80 is preferably attached to the canister side wall 44 in alignment with the gas channel port 46. Alternatively, the plug centering guide 80 may be part of the gas channel port 46. The plug centering guide is preferably made of injection molded plastic, but may be made of any appropriate material. As best seen in FIG. 7, plug centering guide 80 comprises a plurality of radial arms 82 connecting to a peripheral support structure 84 having a guide hole 89. Venting is provided through openings 86 between the radial arms 82 and the support structure 84.

A plug tether 72 is connected to the bag-shaping tether 15, extends through an opening 61 in the structural gas channel 60, through the guide hole 89, and is attached to the plug 70. During normal deployment of the air bag cushion 10, the inflator 20 inflates the air bag cushion which bursts through the deployment door 30 and pulls on the tether 15. As the tether 15 is pulled, it pulls on the plug tether 72 drawing the plug 70 into the plug centering guide 80, thereby preventing venting to the ambient air. The plug may either nest in the gas channel port 46 or on the plug centering guide 80 to block the venting of gas. If the plug nests on the plug centering guide, the plug centering guide is preferably conically shaped to ensure a better seal.

Figure 5:
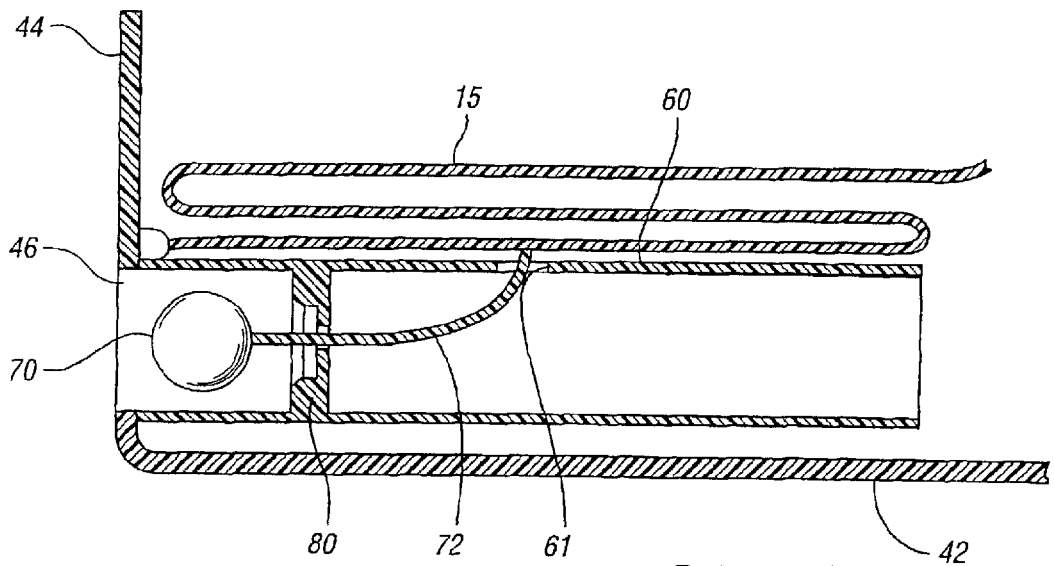
FIG. 5 is a cross-sectional view of a second embodiment of the plug and the gas channel port of the present invention in a position to allow venting.
Figure 6:
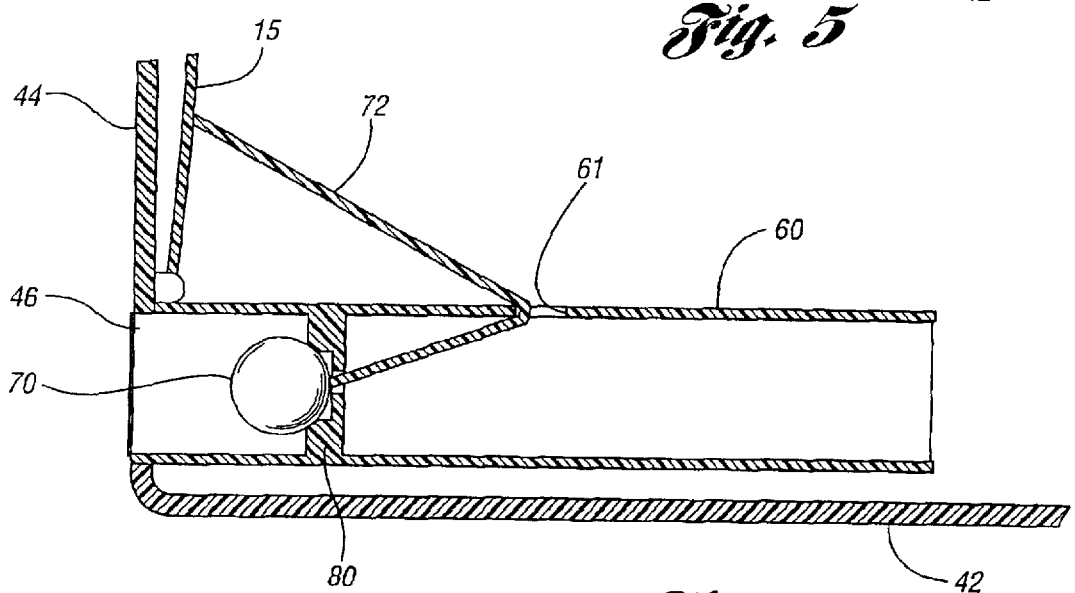
FIG. 6 is a cross-sectional view of a second embodiment of the plug and the gas channel port of the present invention in a position to prevent venting.

An alternative embodiment of the structural gas channel 60, the plug 70, and the plug centering guide 80 is shown in FIGS. 5 and 6. The plug 70 and the plug centering guide 80 are located inside the structural gas channel 60. Otherwise, the plug 70 functions exactly the same. Plug 70 must be small enough in diameter that it does not impede the proper flow of gas outward through structural gas channel 60 unless the plug is pulled firmly into plug centering guide 80.

If force is applied to the deployment door 30 by an out-of-position occupant, the gas generated by the inflator 20 is not able to expand air bag cushion 10 to the point where plug tether 72 pulls plug 70 into centering guide 80 so as to block the flow of gas. As a result, the gas is free to flow out through the structural gas channel 60, the gas channel port 46, and the plug centering guide 80.

If a particular air bag design does not include a bag-shaping tether, plug tether 72 can connect the plug 70 directly to the air bag cushion 10.

Figure 8:
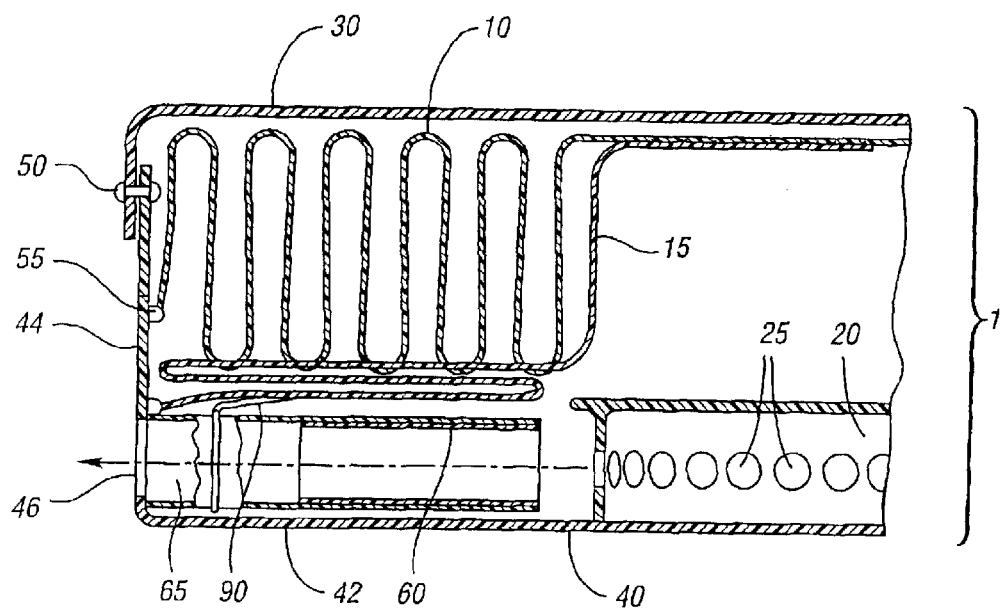
FIG. 8 is a cross-sectional view of a third embodiment of the air bag module of the present invention in the undeployed condition.
Figure 9:
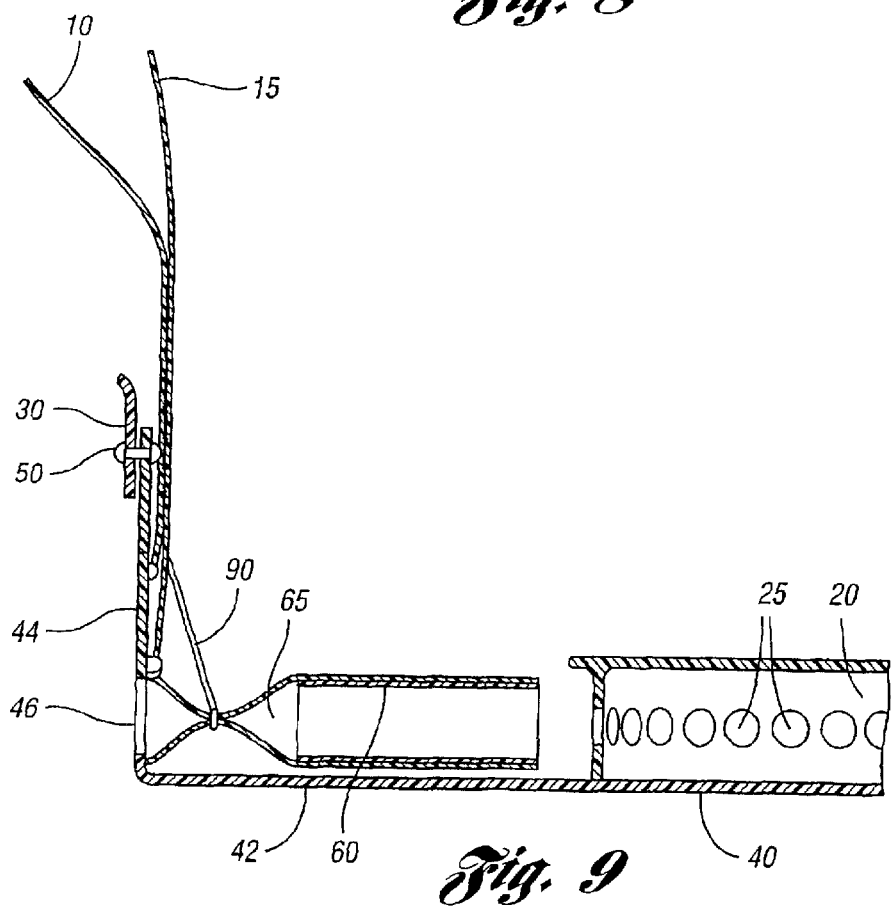
FIG. 9 is a cross-sectional view of the third embodiment of the air bag module of the present invention with the air bag deployed.

A third embodiment of the present invention is shown in FIGS. 8 and 9. The structural gas channel 60 communicates with the gas channel port 46 in the canister 40 through a non-porous fabric gas channel 65. In this embodiment, the structural gas channel 60 is fixed to the backing plate 42 to prevent it from moving. A cinch strap 90 connected to the tether 15 is wrapped around the non-porous fabric gas channel 65. When the air bag cushion 10 is properly deployed, the tether 15 pulls on the cinch strap 90, thereby closing the non-porous fabric gas channel 65 and preventing gas from venting through gas channel port 46.

However, when an external force is applied to the deployment door 30, the air bag cushion 10 is prevented from deploying fully, and therefore the bag-shaping tether 15 does not pull on cinch strap 90 sufficiently to close off the fabric gas channel 65. Structural gas channel 60 and non-porous fabric gas channel 65 remain open and gas is vented therethrough to the ambient air.

Alternatively, a cinch strap 90 can connect the non-porous fabric gas channel 65 directly to the air bag cushion 10 such that the deploying air bag cushion cinches the non-porous fabric gas channel without the need for a bag-shaping tether.

While the best mode for carrying out the invention has been described in detail, those familiar with the art to which this invention relates will recognize various alternative designs and embodiments for practicing the invention as defined by the following claims.

What is claimed is:

1. An air bag module comprising:

an air bag canister having a side wall, the side wall having a gas channel port therein to communicate with ambient air pressure;

an air bag cushion attached to the air bag canister;

an inflator attached to the air bag canister for providing gas, a deployment door attached to the air bag canister;

a structural gas channel connected to the side wall proximate the gas channel port and configured to communicate with the gas channel port to provide venting of gas provided by the inflator to ambient air when the air bag cushion is in a substantially non-deployed condition; and a venting system connecting the structural gas channel to the gas channel port, the venting system having a plug and a plug pulling system connecting the air bag cushion and the plug;

wherein when the air bag cushion is deployed the plug pulling system pulls the plug into the gas channel port to prevent gas from venting therethrough.

2. The air bag module of claim 1 wherein the plug pulling system comprises a tether connecting the plug to the air bag cushion.

3. The air bag module of claim 1 wherein the plug pulling system comprises a bag-shaping tether connecting the air bag cushion to the air bag canister and a plug tether connecting the plug to the bag-shaping tether.

4. The air bag module of claim 1 wherein a plug centering guide is placed over the gas channel port.

5. The air bag module of claim 4 wherein the plug centering guide comprises a plurality of radial arms connected to a peripheral support having a guide hole.

6. The air bag module of claim 4 wherein the plug is pulled into the plug centering guide.

7. The air bag module of claim 1 wherein the structural gas channel is attached to the air bag canister covering the gas channel port and the venting system comprises a plug inside the structural gas channel, a plug centering guide inside the structural gas channel, and a plug pulling system connecting the air bag cushion to the plug wherein when the air bag cushion is deployed, the pulling system is made taut thereby pulling the plug into the plug centering guide preventing any gas from venting therethrough.

8. The air bag module of claim 7 wherein the plug pulling system comprises a tether connecting the plug to the air bag cushion.

9. The air bag module of claim 8 wherein the plug pulling system comprises a bag-shaping tether connecting the air bag cushion to the air bag canister and a plug tether connecting the plug to the bag-shaping tether.

* * * * *